United States Patent [19]

Tsai et al.

[11] Patent Number: 5,101,452
[45] Date of Patent: Mar. 31, 1992

[54] APPARATUS AND METHOD FOR DYNAMIC STEP QUANTIZATION

[75] Inventors: Yusheng T. Tsai, Rochester; Lawrence J. Bernstein, Honeoye Falls, both of N.Y.

[73] Assignee: Eastman Kodak Company, Rochester, N.Y.

[21] Appl. No.: 628,827

[22] Filed: Dec. 17, 1990

[51] Int. Cl.$^5$ .............................................. G06K 9/38
[52] U.S. Cl. ......................................... 382/50; 341/139
[58] Field of Search ................. 382/50; 358/174, 179, 358/446, 464, 467; 341/137, 139, 200

[56] References Cited

U.S. PATENT DOCUMENTS 3,562,420  2/1971  Thompson ........................ 358/138
4,611,342  9/1986  Miller et al. ..................... 341/139

Primary Examiner—David K. Moore
Assistant Examiner—Jose L. Couso
Attorney, Agent, or Firm—Edward Dugas

[57] ABSTRACT

The apparatus and method of the present invention operates upon the problem of contouring that is encountered in the digital image processing field. The preferred apparatus embodiment of the invention forms quantizing steps that vary in size during the processing of signals in order to minimize contouring effects. The embodiment includes a transforming function block for receiving digital input signals each representing a magnitude value requiring quantization, the transforming function block provides an output gain value that is a function of the magnitude of the value of each received digital input signal. A quantizer is provided for receiving the digital input signals and for performing quantizing steps on the digital input signals to provide a multibit quantized digital signal. A first randomizer is used to randomize the least significant bits of the multibit quantized digital signal when the output gain value is less than or equal to threshold value. Lastly there is provided a second randomizing means for randomizing a number of bits of the multibit quantized digital signal when the output gain value from the transforming function block is greater than the threshold value.

8 Claims, 3 Drawing Sheets

APPARATUS AND METHOD FOR DYNAMIC STEP QUANTIZATION

BACKGROUND OF THE INVENTION

1. Technical Field

The present invention is directed to an apparatus and a method for digital image processing and more particularly to an apparatus and a method for minimizing the visual perception of artifacts associated with contouring.

2. Description of the Prior Art

When processing digital images it is often necessary to use quantizers to express the processed image data in a digital format. When quantizing is applied it may create a contouring problem. Contouring is the creation of a visual effect that was not present in the original image before it was digitally processed. Digital image processing systems which process signals that are gamma corrected, filtered, convoluted, spatially operated upon, color space converted and/or interpolated have a particular need for solving the contouring problem. This need arises due to the fact that the previously-mentioned processes introduces a gain that causes an image data to have a value that is greater than what the system can handle. Such being the case, these gains will in turn introduce missing codes. If the missing codes occur in a non-random manner, such that they repeat for a large number of times, they will be visible to the human eye when an image is formed using signals that have these codes missing. With large gains, any quantization steps that are used also becomes large and therefore more noticeable when images are formed using these quantized results. The missing codes can be manipulated to reduce this contouring problem by causing their existence to occur in a random pattern within the systems maximum computational gain value. With a random pattern the human eye has more difficulty in noticing the pattern. If the pattern is random enough the eye will miss it altogether.

The present apparatus and method are directed to a solution for minimizing the contouring problem.

SUMMARY OF THE INVENTION

In the preferred apparatus and method embodiments of the invention the size of the quantization step that is used in the digitizing process is dynamically adjusted by a random number. The adjustment is arranged in such a way that the range will be within the maximum quantization step size that is dictated by the gain of the system. The method implementation of the present invention is comprised of three steps; the first is to determine the maximum computation gain of the system as a function of the output signal and the gamma, density and other processing parameters, from which the computation gain is to be derived. The gain and the precision of processing defines a quantization step for a selected portion of the image. The value of the quantization step is used as the divider to generate a random code within a range of the quantization step. The second step is the generation of the random code such that the value is between 0 and the maximum value of the quantization step. The third step is to form the output code as a function of the random code and the input digital image signals.

As part of the preferred apparatus embodiment of the invention for forming quantizing steps that vary in size during the processing of signals in order to minimize contouring effects there is provided; a transforming means for receiving digital input signals each representing a magnitude value requiring quantization, the transforming means provides an output gain value that is a function of the magnitude of the value of each received digital input signal. A quantizing means is provided for receiving the digital input signals and for performing quantizing steps on the digital input signals to provide a multibit quantized digital signal. A first randomizing means is used to randomize the least significant bits of the multibit quantized digital signal when the output gain value is less than or equal to a threshold value. Lastly there is provided a second randomizing means for randomizing a number of bits of the multibit quantized digital signal when the output gain value from the transforming means is greater than the threshold value.

From the foregoing it can be seen that it is a primary object of the present invention to provide an improved apparatus and associated method for decreasing the contouring effects in processed digital image signals.

It is another object of the present invention to provide for random number generation and automatic range adjustment to generate an appropriate quantization step size in response to the random number generation.

A further object of the present invention is to randomize the occurrence of a quantization step within a predetermined range.

These and other objects of the present invention will become more apparent when taken in conjunction with the following description and drawings wherein like characters indicate like parts and which drawings form a part of the present specification.

DESCRIPTION OF THE PREFERRED EMBODIMENTS OF THE INVENTION

Figure 1:
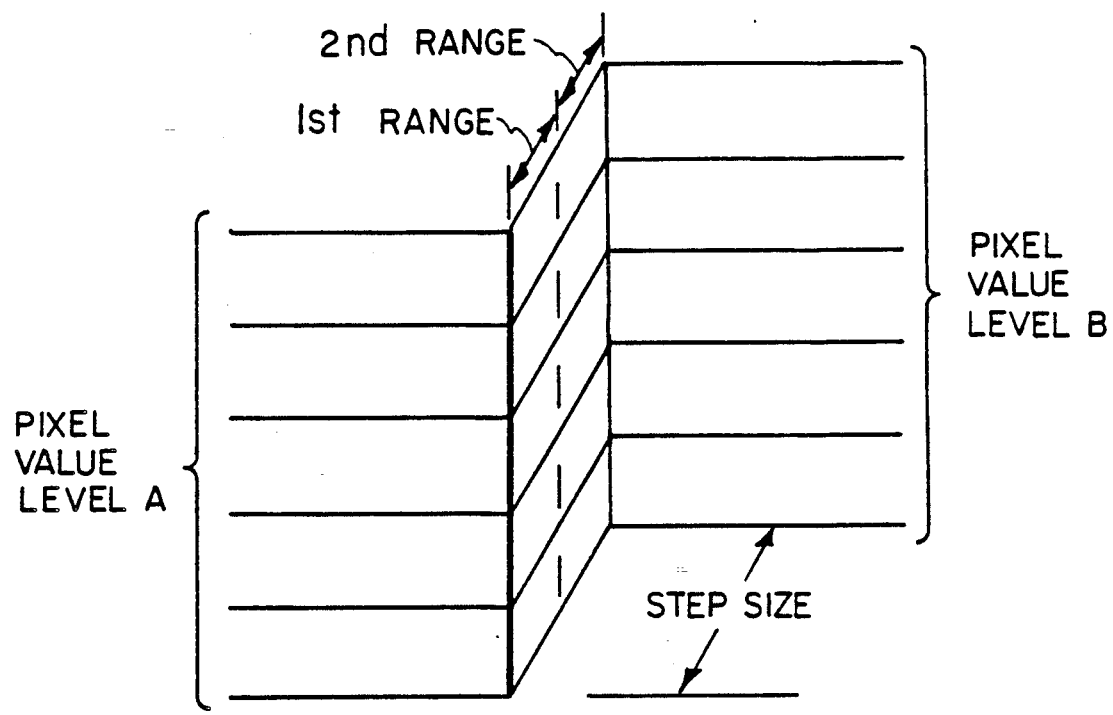
FIG. 1 illustrates the uniform step change from one level to another which occurs in systems using a fixed quantization level.

FIG. 1 illustrates the process that occurs in a quantizer which has fixed threshold values and step sizes within the system's gain range. When an input pixel value is in the first range it is quantized to a first value A. When the input pixel value is in the second range it is quantized to a second value B. This process of moving all of the input pixel values that are above or below the fixed quantizer threshold value into one level or the other results in the creation of distinct lines in any image that is formed using the quantized values.

Figure 2:
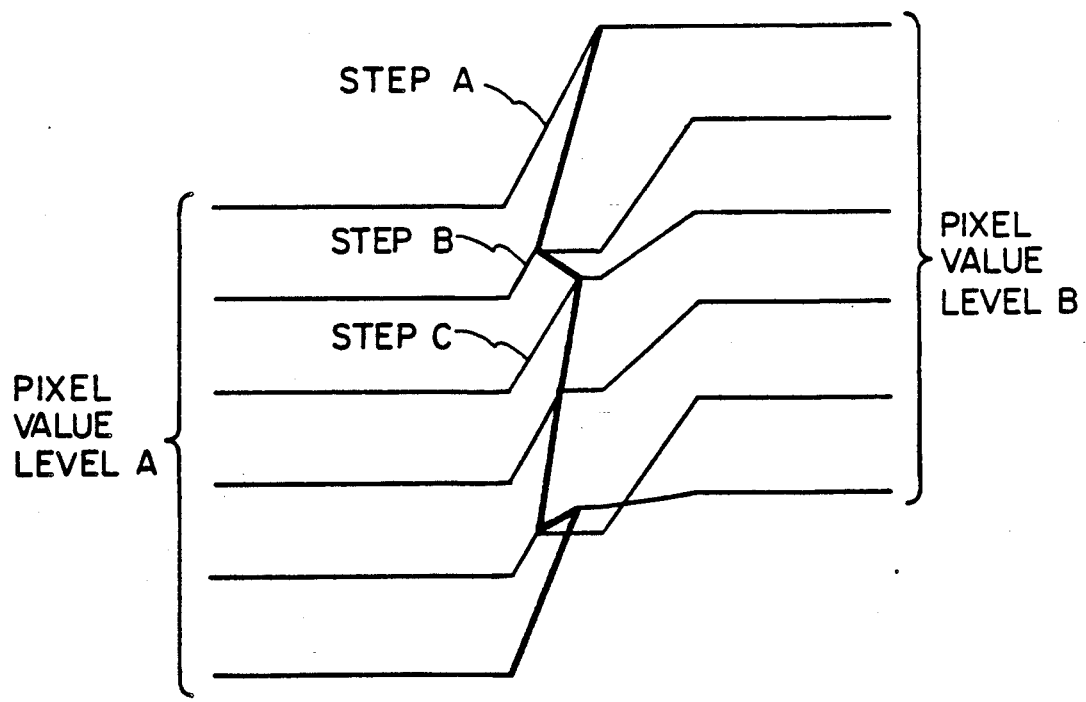
FIG. 2 illustrates the lack of uniformity in the step change which occurs in a system utilizing the present invention.

FIG. 2 illustrates the process of the present invention wherein the threshold for placing a value at either one level of the other is not fixed because the steps of the quantization are not fixed. With this arrangement a repeated pixel value does not appear as a visible line across a later formed image. Note, in FIG. 2 the size of step A is different from either step B or step C. Because the step sizes may randomly be assigned a value of from 0 to a value that is equivalent to a maximum step size it is possible to have two or more steps for making the transition between pixel value level A and pixel value level B.

Figure 3:
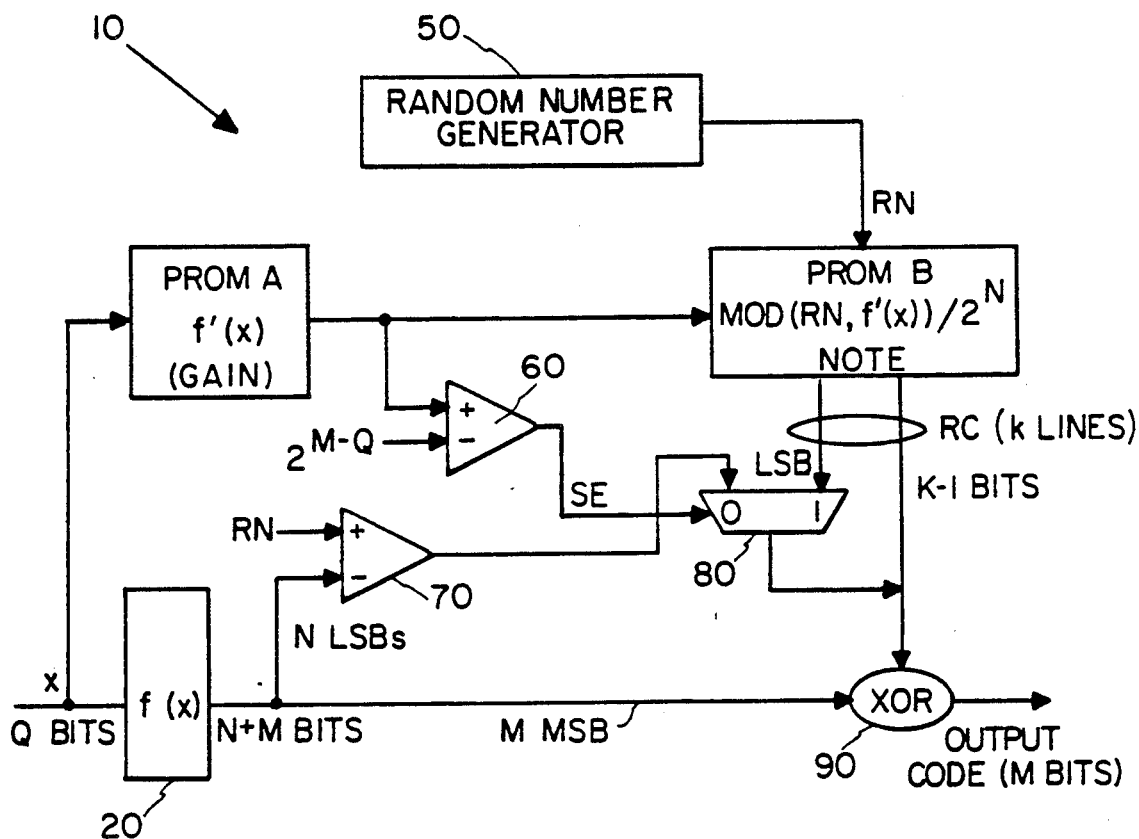
FIG. 3 is a system block diagram illustrating the preferred embodiment of the invention.

The preferred apparatus embodiment of the invention for providing the FIG. 2 output is implemented with the system 10 of FIG. 3. Two inputs are provided to the circuit 10, they are; the signal $2^{M-Q}$ and a parallel group of Q bits, labeled x which represents an input image pixel value. A full input image will have a long serial string of groups of Q-bits each being processed in turn. The quantity M is the number of output bits that are selected to form the final output code value for each pixel. M-Q is therefore, a number which is equal to the difference between the number of bits forming the input group and the number of bits forming the multibit output code value. The serial string of parallel input bits Q is fed to a block 20 which block represents a function f(x) that incorporates a quantizing based function that is to be performed on the image pixels, for example a gamma correction function. As can be appreciated, the function f(x) is dependent on the type of imaging system that is using the quantization steps and the results desired in the output image. Additionally, the Q-bits are directed to the input of a PROM A, which implements a gain function [f'(x)] that is dependent on the gain of the system performing the signal processing. The output from the PROM A is directed to the input of a second PROM labeled, PROM B and to the positive input of a comparator 60. The size of PROM A is dependent on the number of bits forming the gain value and the resolution of the maximum quantization step. PROM B also receives an input signal RN which is a random number that is generated by a random number generator 50. The PROM B functions as a residue module generator and operates to modify the received number RN to provide an output RC that is in the range of: gain $> =$ residue code $> =0$. If the gain value from the output of the PROM A is smaller than or equal to a threshold value $2^{M-Q}$, then the output RC of the PROM B is set to zero. When this happens, only a randomized least significant bit (LSB) needs to be combined to the final output code value. To make this determination the comparator 60 receives, on its negative input, the signal $2^{M-Q}$ and compares this signal against the signal on it's positive input. When the positive signal is greater, the output of the comparator 60, which is a select signal (SE), is of one state and when the positive signal is less, the output signal SE is of another state. A two input multiplexer 80 receives the LSB from the PROM B and outputs that bit to an input of an XOR circuit 90 for logical combination to the final output code value when the SE signal gates the multiplexer's input, labeled 1, to its output. The signal RC is formed from K bits, with the least significant bit going to the 1 labeled input of the multiplexer 70 and the K-1 bits passing directly to the XOR circuit 90. The select signal SE controls the choice between the LSB signal and a signal that is received from the output of a comparator 70. This signal is applied to the multiplexer's input labeled 0. The comparator 70 receives, at its negative input, the N number of least significant bits (N LSBs) that are split off from the N+M bits that appear at the output of block 20. The positive input to the comparator 70 is the random number RN that is obtained from the random number generator 50. Comparing the RN-bit number with the N least significant bits (N LSBs) from the function block 20 provides a randomness to the least significant bit. This output, from comparator 70, is applied to the 0 input of the multiplexer 80 and is gated to the XOR circuit 90 when the maximum gain of the system as defined by the value $2^{M-Q}$ is not exceeded by the values from the PROM A. As previously stated, in this situation, the value of RC, which is the output from the PROM B, will be 0.

Figure 4:
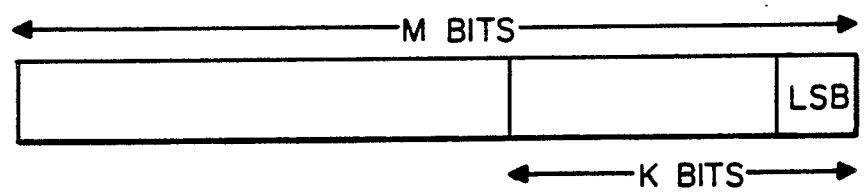
FIG. 4 illustrates the bit arrangement for the output data from the system of FIG. 3.

The single output bit LSB, from the multiplexer 80, is added to the K-1 bits from the output of the PROM B and provided as an input to the XOR circuit 90. The M most significant bits from the output of the block 20 are directed as a second input to the XOR circuit 90. The logically combined output from the XOR circuit 90 forms the final output code with an M number of bits. The M bit formation of the output code is illustrated in FIG. 4. The output code is shown M bits in length with a K bit segment that includes the LSB. In the most basic operation either the least significant bit or the K number of bits are logically combined with the M bits from block 20, dependent on whether the gain is less than or greater than the threshold value. The implementation shown in FIG. 3, which is the best mode, uses the least amount of a hardware to perform the selection of which bits are inputted to the XOR 90. Other implementations may be used to perform the selection, but with an increase in complexity or cost.

The following table sets forth a detailed example of the values used for the programming of the PROMs, based on some selected system parameters:

| | γ |
|---|---|
| ASSUME: | 1) f(x) = x , γ = 2.2 |
| | 2) Q = 3, M=6 |
| Parameters: | |
| | γ 2.2 |
| Maximum output = (max (x)) = 7 = 72 | |
| N + M = 7 ==>N = 1 | |
| MG (Maximum | |
| Gain) = 72/7 = 10 (needs 4 bits ==> k = 3) | |
| MQ | |
| 2   =8 | |
| RC = Mod[RN, f' (x)]/($2^N$) | |

| Address of PROM A Input = x Q = 3 bits | f(x) N+M = 7 bits | Output of PROM A Gain = f(x) 4 bits | SE | RN (4bits) | RN (1bit) | Output of PROM B RC (3bits) | Final output |
|---|---|---|---|---|---|---|---|
| 0 | 0 = 0000000 | 1 = 0001 | 0 | 13 | 1 | 0 | 1 = 000001 |
| 1 | 1 = 0000001 | 1 = 0001 | 0 | 10 | 0 | 0 | 0 = 000000 |
| 2 | 5 = 0000101 | 2 = 0010 | 0 | 3 | 1 | 0 | 3 = 000011 |
| 3 | 11 = 0001011 | 3 = 0011 | 0 | 5 | 1 | 0 | 6 = 000110 |
| 4 | 21 = 0010101 | 5 = 0101 | 1 | 12 | x | 001 | 11 = 001011 |
| 5 | 34 = 0100010 | 6 = 0110 | 1 | 7 | x | 000 | 16 = 010000 |
| 6 | 52 = 0110100 | 8 = 1000 | 1 | 11 | x | 001 | 27 = 011011 |

-continued

| Address of PROM A | | Output of PROM A | | | Output of PROM B | |
|---|---|---|---|---|---|---|
| Input = x Q = 3 bits | f(x) N+M = 7 bits | Gain = f(x) 4 bits | SE (4bits) | RN (1bit) | RC (3bits) | Final output |
| 7 | 72 = 1001000 | 10 = 1010 | 1 | 9 | x | 100 | 32 = 100000 |

The output code generation may take the following form: NINT(output code+0.5)−RC. The value 0.5 is added to the term "output code" in order to insure that the resulting value is equal to at least 2.

The following is also applicable:

if $f'(x) < = 2^{M-Q}$, then $RC=0$

If the final output code $< = 2^{M-Q}$, then $RC=0$;

$MG = $ Maximum Gain $= $ Max $[f'(x)]$;

$K = INT\{\log_2 (MG-1)\} - N + 1$

Figure 5:
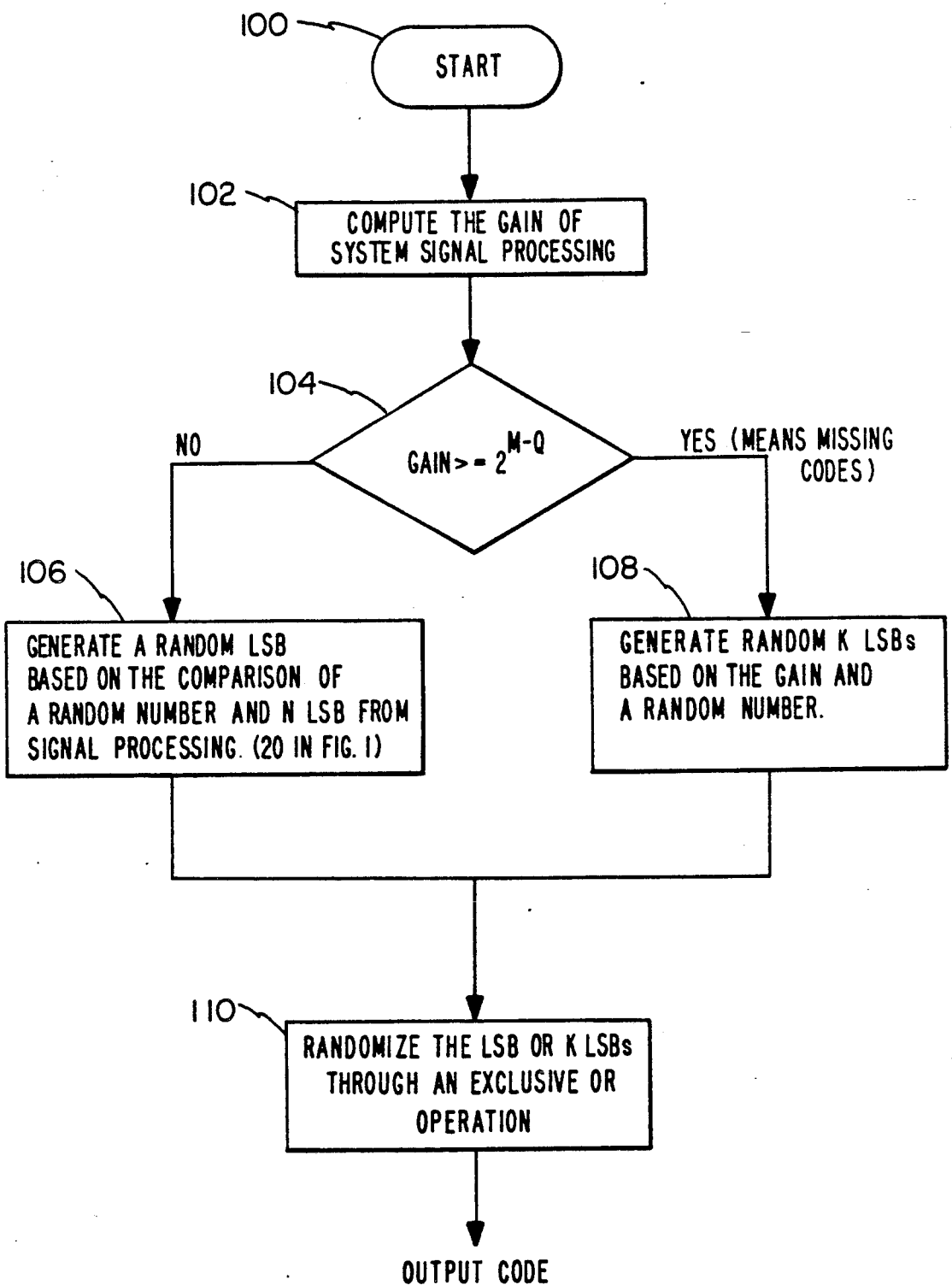
FIG. 5 is a flow chart illustrating the preferred steps in the operation of the system of FIG. 3.

FIG. 5 illustrates the method of the present invention in flow chart form. The method starts with the start block 100 and progresses to the computation of the gain of the system's signal processing in block 102. The computed gain value from block 102 is compared in block 104 against the value $2^{M-Q}$ and if the value is greater (Yes) the method advances to block 108. In block 108 there is generated random K LSBs based on the gain and a random number. If the value is less than (No) the method advances to block 106 causing the generation of a random LSB that is based on the comparison of a random number and the N LSBs from the signal processing function containing the quantizing function. The outputs from either block 108 or block 106 are randomized in block 110 through, for example, an Exclusive-OR operation to provide the desired, randomized output code.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

We claim:

1. An apparatus for forming quantizing steps that differ in size during the processing of signals in order to minimize contouring effects comprising in combination:

transforming means for receiving digital input signal each representing a magnitude value requiring quantization, said transforming means providing an output gain value that is a function of the magnitude of the value of each received digital input signal;

quantizing means for receiving said digital input signals and for performing quantizing steps on said signals to provide a multibit quantized digital signal;

first randomizing means for randomizing the least significant bits of said multibit quantized digital signal when the output gain value is less than or equal to a threshold value;

second randomizing means for randomizing a number of bits of said multibit quantized digital signal when the output gain value from said transforming means is greater than the threshold value; and threshold means coupled to said transforming means for providing an output indicative of whether said output gain value is less than, equal to, or greater than, a selected threshold value.

2. An apparatus for forming quantizing steps that differ in size during the processing of signals in order to minimize contouring effects comprising in combination:

transforming means for receiving digital input signals each representing a magnitude value requiring quantization, said transforming means providing an output gain value that is a function of the magnitude of the value of each received digital input signal;

quantizing means for receiving said digital input signals and for performing quantizing steps on said signals to provide a multibit quantized digital signal;

comparing means having a first input for receiving a random number and a second input connected to the output of said quantizing means, for receiving the least significant bits of said multibit quantized signal and for providing randomized least significant bits;

randomizing means for generating a number of randomized bits when the output gain value from said transforming means is greater than a threshold value; and logic means for logically combining said randomized least significant bits from said comparing means with said multibit quantized digital signal from said quantizing means when the output gain value is below the threshold value and for logically combining the number of randomized bits from said randomizing means to said multibit quantized digital signal when the output gain value is above the threshold value to provide a quantized multibit output digital signal having different step sizes.

3. The apparatus according to claim 2 wherein the threshold value is set to $2^{M-Q}$ where Q equals the number of bits forming the digital input signal, and M equals the number of bits forming the quantized multibit output digital signal.

4. The apparatus according to claim 2 wherein said randomizing means is comprised of:

second transforming means for receiving the output gain value from the first named transforming means and for providing a random group of bits less in number than the number of bits forming the multibit quantized digital signal when the value of the gain is less than the threshold value.

5. The apparatus according to claim 2 wherein said logic means is an Exclusive-OR logic.

6. The apparatus according to claim 4 and further comprising:

switch means for connecting the output of said second transforming means to said logic means when said gain value is above the threshold value and for connecting the output of said comparing means to said logic means when said gain signal is below the threshold value.

7. The apparatus according to claim 6 wherein said switch means is a multiplexer having a first input for receiving the output of said second transforming means and a second input for receiving the output from said comparing means and a selection input for receiving a selection signal for controlling the connection of said first input or said second input to said logic means as a function of whether said gain value is above or below the threshold value.

8. The apparatus according to claim 7 and further comprising:

second comparing means having a first input connected to receive the output gain value from the first named transforming means and a second input for receiving the threshold value and for providing a selection signal to said multiplexer, said selection signal having a first state when said output gain value is below the threshold value and a second state when the output gain value is above the threshold value.

* * * * *